United States Patent [19]

Cutler

[11] Patent Number: 5,583,638
[45] Date of Patent: Dec. 10, 1996

[54] ANGULAR MICHELSON INTERFEROMETER AND OPTICAL WAVEMETER BASED ON A ROTATING PERISCOPE

[75] Inventor: Gregory M. Cutler, Cupertino, Calif.

[73] Assignee: Hewlett-Packard Company, Palo Alto, Calif.

[21] Appl. No.: 95,630

[22] Filed: Jul. 21, 1993

[51] Int. Cl.$^6$ ....................................................... G01B 9/02
[52] U.S. Cl. ............................................. 356/346; 356/358
[58] Field of Search ........................................ 356/346, 345, 356/358

[56] References Cited

U.S. PATENT DOCUMENTS

| | | |
|---|---|---|
| 3,471,239 | 10/1969 | Woodson . |
| 3,551,055 | 12/1970 | Chitayat . |
| 3,926,523 | 12/1975 | Chapman . |
| 4,052,129 | 10/1977 | Schawlow et al. . |
| 4,165,183 | 8/1979 | Hall et al. . |
| 4,319,843 | 3/1982 | Gornall ................................ 356/346 |
| 4,329,055 | 5/1982 | Schaefer et al. ................... 356/346 |
| 4,915,502 | 4/1990 | Brierley . |
| 4,979,827 | 12/1990 | Matsui ................................ 356/356 |
| 5,150,172 | 9/1992 | Brierley . |
| 5,159,405 | 10/1992 | Ukon ................................... 356/346 |
| 5,196,902 | 3/1993 | Solomon ............................. 356/346 |
| 5,349,438 | 9/1994 | Solomon ............................. 356/346 |

OTHER PUBLICATIONS

HSP50016, IC Master 1993, Harris Semiconductor, Nov. 1992.
"RF Design," pp. 39–46, Nov. 1992.
"Laser Wavelength Meters," by Snyder, National Bureau of Standards, Laser Focus, May 1982, pp. 55–60.

Primary Examiner—Frank Gonzalez
Assistant Examiner—Robert Kim

[57] ABSTRACT

The present invention concerns an interferometer for measuring wavelengths using a rotating periscope and a laser of known wavelength. The rotating periscope uses parallel reflectors mounted on a rotating platform. A beam splitter splits an input beam into two optical paths which reflect off the rotating periscope and back reflectors so that the paths will have a path length difference. The beam splitter splits a reference beam from the laser with known wavelength into two reference optical paths which counter-propagate the input beam's optical paths. The light is recombined in a beam splitter to form an interference signal and a reference interference signal so that the input beam's wavelength can be determined.

16 Claims, 6 Drawing Sheets

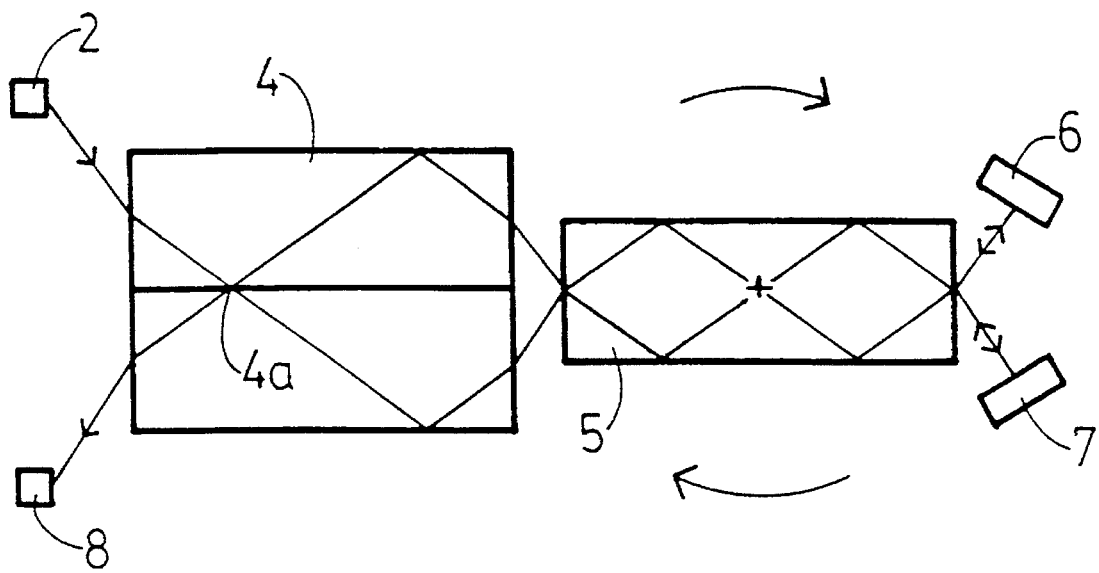
(Prior Art)
FIG._1.
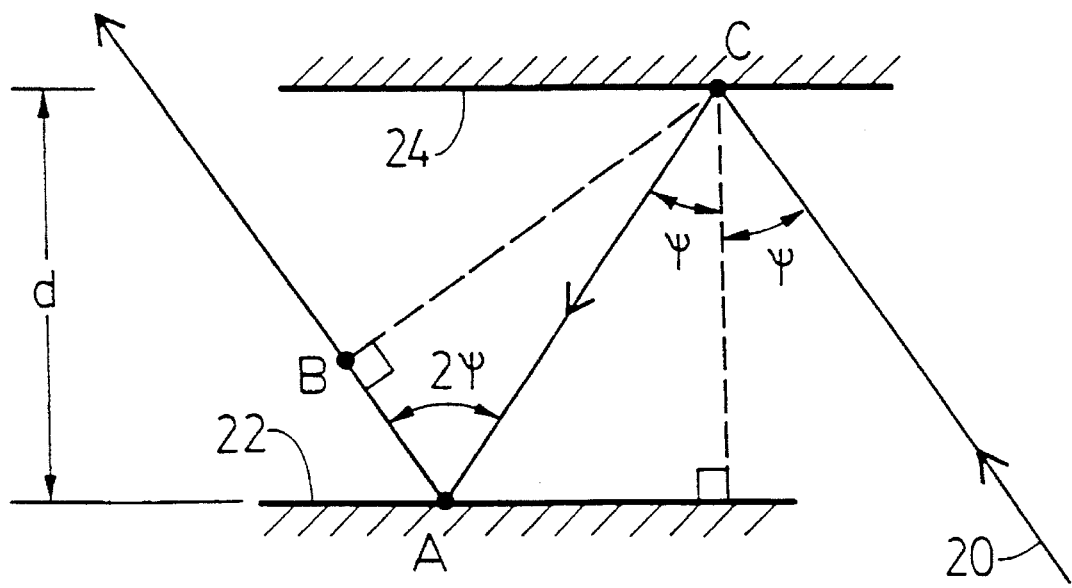
FIG._2.

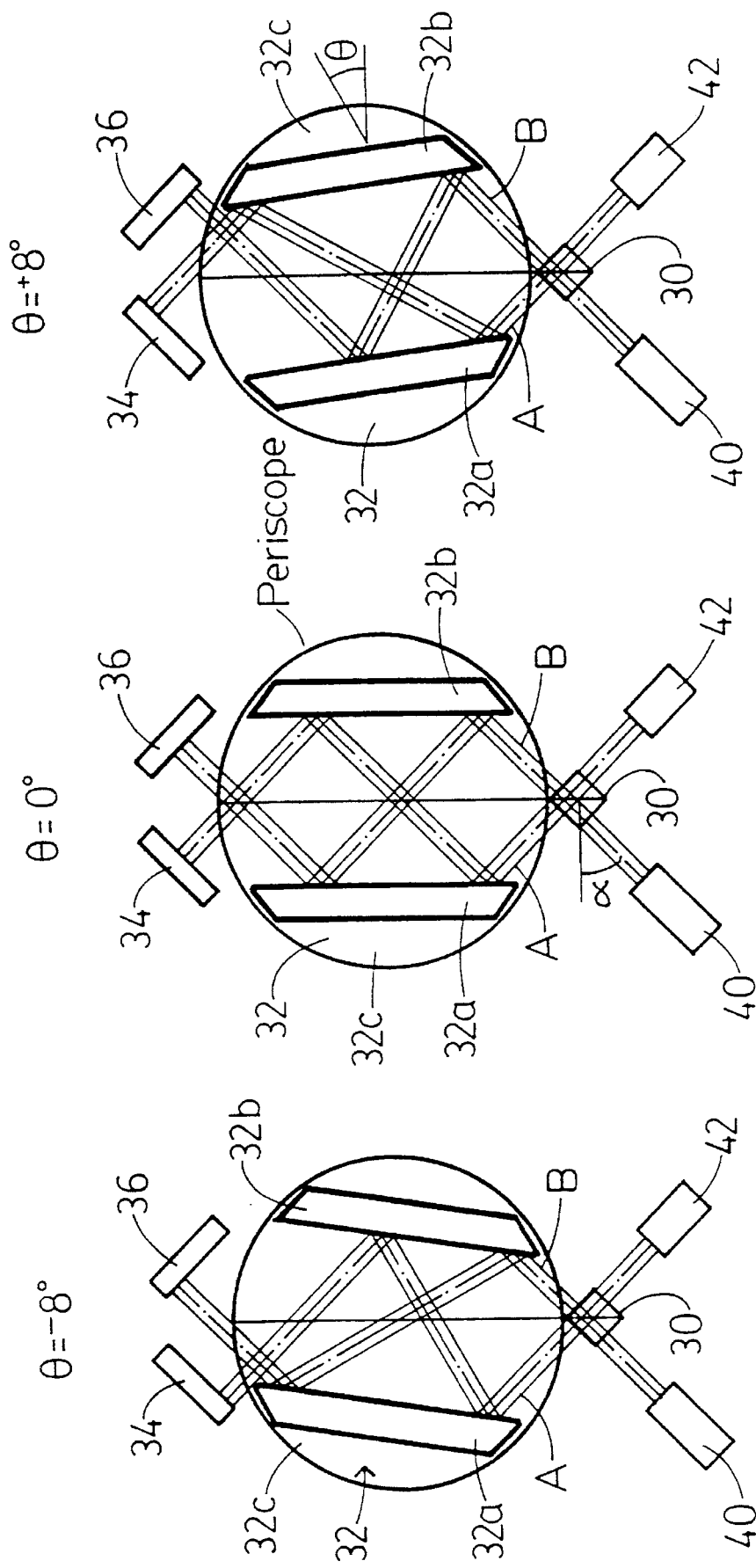

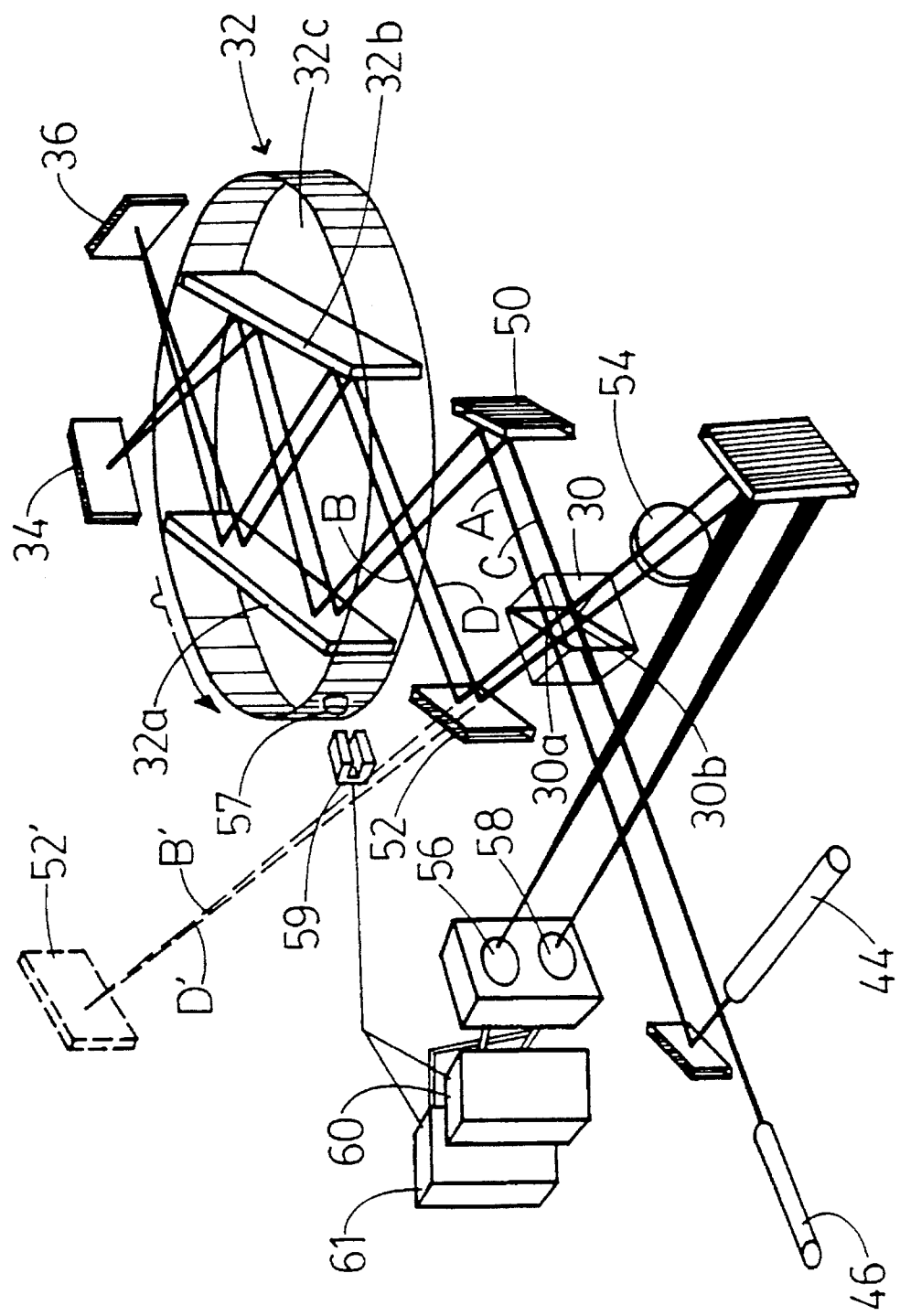
FIG._4.

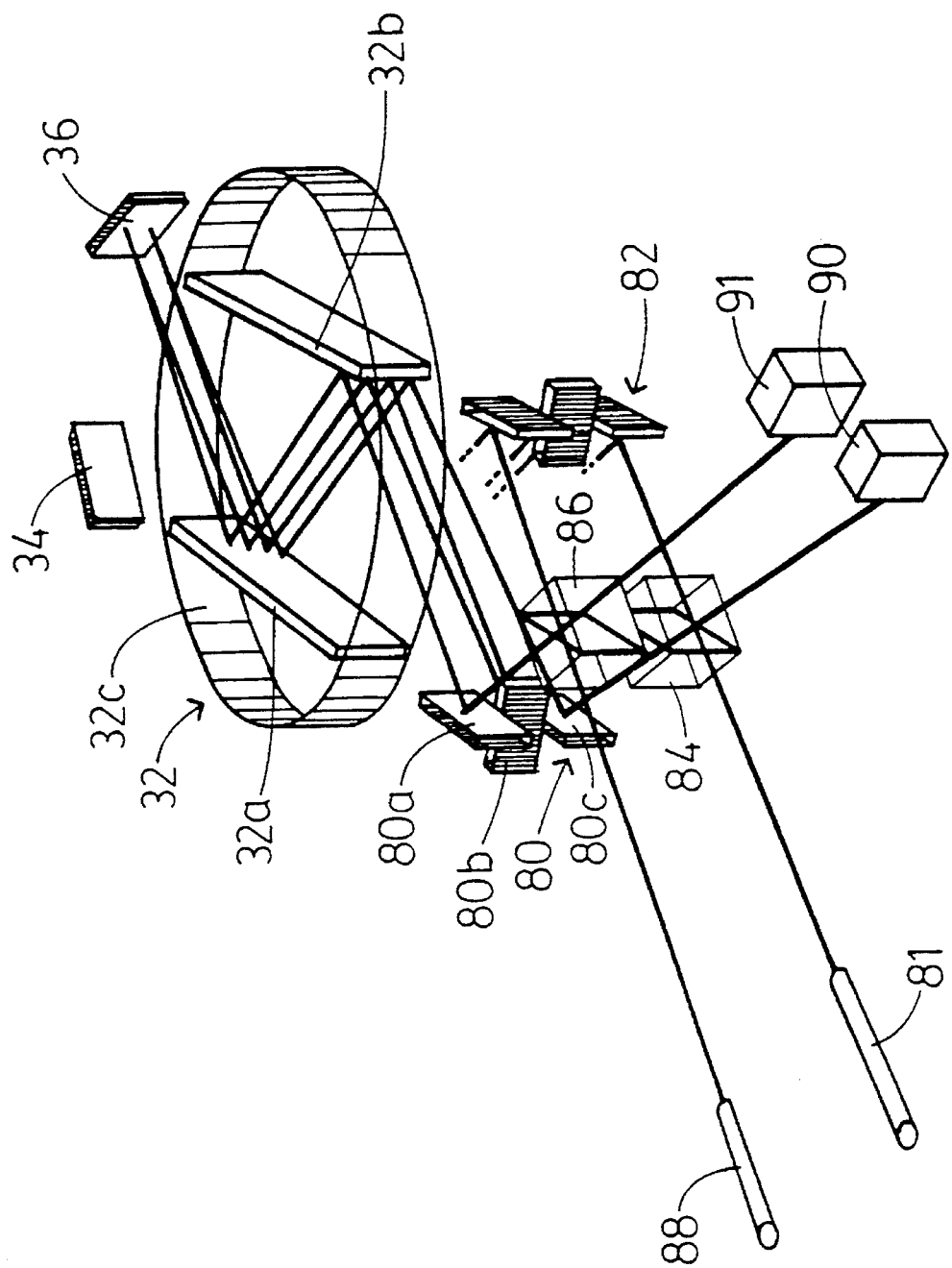
FIG._5.

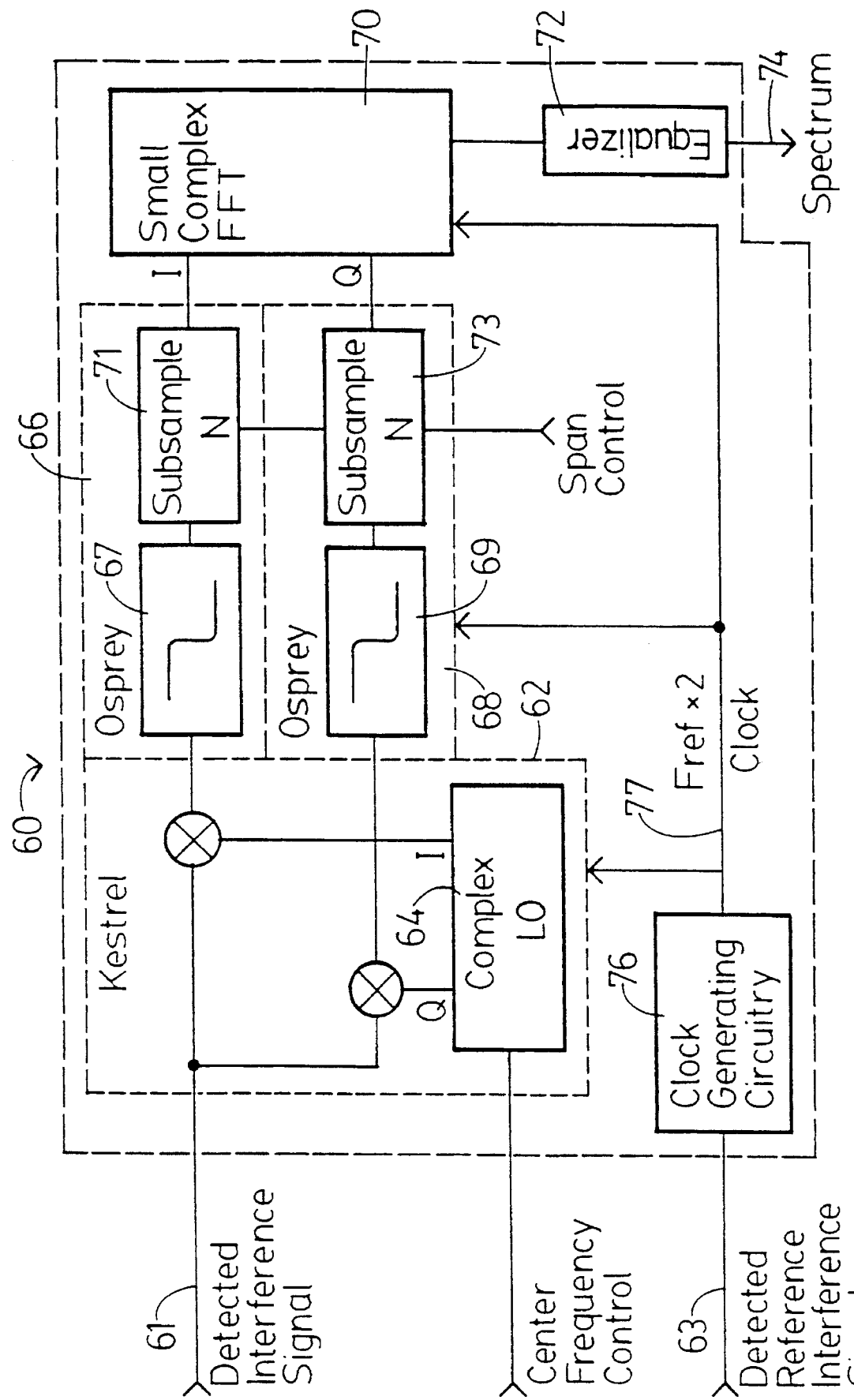
FIG._6.

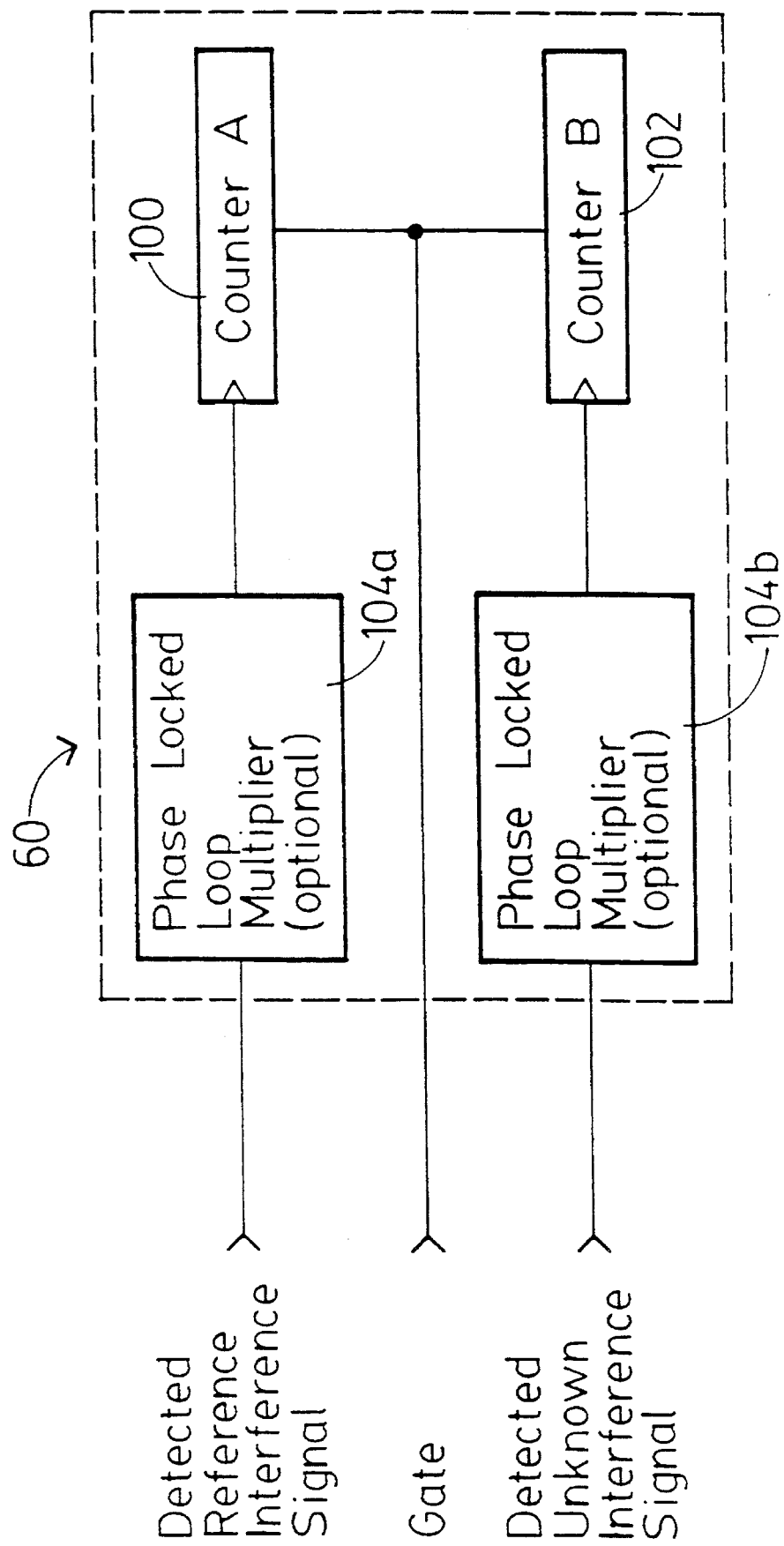
FIG._7.

5,583,638

ANGULAR MICHELSON INTERFEROMETER AND OPTICAL WAVEMETER BASED ON A ROTATING PERISCOPE

BACKGROUND OF THE INVENTION

This invention relates to dynamic interferometers used to determine the wavelength of an unknown signal or used to determine the position of a movable element.

U.S. Pat. No. 4,329,055, Schaefer et al., describes an interferometer using a rotating parallelpipedic transparent body. As shown in FIG. 1 (prior art), which is simplified rendering of FIG. 1 of the Schaefer patent, Schaefer discloses the use of a laser source 2 that sends an input beam to the beam splitter 4. The beam splitter 4 at point 4a splits the incoming light beam into two arm beams. The two arm beams travel through the rotating parallelpipedic transparent body 5 and are reflected off mirrors 6 and 7. The two arm beams then return to point 4a in the beam splitter 4 and are recombined into a interference signal beam that is sent to detector 8. The interference signal detected at the detector 8 will have an intensity that depends on the wavelength of the input beam and the path length difference between the arm beams. This path length difference is produced in the rotating parallelpipedic transparent body 5 and changes as the parallelpipedic transparent body 5 rotates.

Although only one input signal is shown in FIG. 1, Schaefer et al. discloses the use of both an input signal of a known wavelength which is split into reference arm beams and an input signal of an unknown wavelength which is split into unknown wavelength arm beams. The use of an input signal of a known wavelength increases the accuracy of the determination of the unknown wavelength. The input signal of the known wavelength and the input signal of the unknown wavelength are sent into the apparatus in parallel along different paths. Since the reference arm beams comprise different paths from the unknown wavelength arm beams, the reference arm beams and the unknown wavelength arm beams will have different contact points with the reflective surfaces of the parallelpipedic transparent body 5 and the interferometer will be sensitive to any lack of flatness of these reflective surfaces. Another disadvantage of the interferometer disclosed in Schaefer is that the refractive index of the rotating parallelpipedic transparent body 5 is wavelength dependent so that beams with different wavelengths refract at different angles inside the rotating bodies.

It is an objective of the present invention to provide a wavelength meter with improved accuracy.

SUMMARY OF THE INVENTION

In accordance with the principles of the present invention, the above and other objectives are realized by using an interferometer using an input light beam of unknown wavelength. The interferometer comprises a reference laser adapted to produce an input light beam of a known wavelength and a beam splitter adapted for splitting the input light beam into two beams along first and second optical paths and adapted for splitting the input light beam of a known wavelength into two beams along a first reference optical path and a second reference optical path. The interferometer further comprises a rotating periscope for varying the length of at least the first optical path and the first reference optical path. The rotating periscope comprises first and second reflectors on a rotating platform. The first and second reflectors are substantially parallel. The interferometer further comprises back reflector means for reflecting light in the at least the first optical path back and the first reference optical path through the rotating periscope and comprises means for recombining light from the first and second paths into an interference signal and for recombining light from the first reference path and second reference path into a reference interference signal. Additionally the interferometer comprises a detector for detecting the interference signal and a second detector for detecting the reference interference signal.

Additionally, in accordance with the principles of the present invention, the above and other objectives are realized by using a method for measuring the wavelength of a light beam from light source using a second light beam of known wavelength. The method comprises the steps of splitting the light beam into two beams along a first and second optical path and splitting the second light beam of a known wavelength into two beams along a first reference optical path and a second reference optical path; reflecting the light in the two optical paths and the light in the two reference optical paths off a pair of parallel reflectors; arranging the first and second light beams such that the first optical path and the first reference optical path are substantially the same and such that the second optical path and the second reference optical path are substantially the same, the arranging step being such that light in the first optical path counter-propagates light in the first reference optical path and light in the second optical path counter-propagates light in the second reference optical path; varying the length of the first and second paths and the length of the first reference optical path and the second reference optical path by rotating the reflectors; recombining light from the first and second optical paths into an interference signal; recombining light from the first and second reference optical paths into a reference interference signal; detecting the interference signal and the reference interference signal; and determining the wavelength of the light beam from the interference signal and the reference interference signal.

BRIEF DESCRIPTION OF THE DRAWINGS

The above and other features and aspects of the present invention will become more apparent upon the reading of the following detailed description in conjunction with the accompanying drawings, in which:

FIG. 1 is a schematic of a prior art interferometer;

FIG. 2 is a diagram illustrating the lateral and temporal shearing that occurs to a light beam sent into parallel reflectors;

FIGS. 3(a), 3(b), and 3(c) are schematics that show the beam splitter, rotating periscope and back reflector of the present invention for three different periscope orientations $\theta=-8°, 0°, 8°$, respectively;

FIG. 4 is a three dimensional view showing an angular Michelson interferometer of the present invention;

FIG. 5 is a three dimensional view showing an alternate embodiment of the interferometer showing bi-directional reflectors and two beam splitters;

FIG. 6 is a diagram of a down converter circuit for use in one embodiment of the present invention; and FIG. 7 is a diagram of a wavelength determining circuit that uses counters for use in an embodiment of the present invention.

Equivalent structures are labelled with the same numbers between the figures.

DETAILED DESCRIPTION OF THE PREFERRED EMBODIMENT

FIG. 2 is a diagram illustrating the lateral and temporal shearing that occurs to a light beam sent into parallel reflectors. The light beam 20 is reflected off parallel reflectors 22 and 24. The light beam exits the parallel reflectors 22 and 24 with the same orientation as it enters but with a lateral and temporal shear. The reflectors 22 and 24 are separated by a distance d, and light beam 20 is incident on the reflector 24 at angle $\psi$ with the normal to reflector 24. The lateral shear is given by the line segment BC and the temporal shear is given by the combination of the line segments CA and AB.

$$\text{Lateral Shear}(LS) = \overline{BC} = \frac{\sin 2\psi}{\cos\psi} \ d = 2d\sin\psi$$

$$\text{Temporal Shear}(TS) = \overline{AB} + \overline{AC} = \frac{(1+\cos 2\psi)}{\cos\psi} \ d = 2d\cos\psi$$

FIGS. 3(a), 3(b) and (c) are schematics that show the beam splitter 30, rotating periscope 32 and back reflectors 34 and 36 of the present invention for periscope orientations $\theta = -8°$, $0°$, $8°$, respectively. The rotating periscope 32 comprises substantially parallel reflectors 32a and 32b mounted on a rotating platform 32c. The parallel reflectors 32a and 32b are separated by air.

Light from the source 40 is split by the beam splitter 30 along paths A and B. The light in these paths is reflected off of the parallel reflectors 32a and 32b and reflected off of the back reflectors 34 and 36. Since the light in paths A and B is reflected off the back reflectors 34 and 36 back through the rotating periscope 32, the lateral shear of the light beam is removed. As shown in FIGS. 3(a), 3(b), and 3(c) with $\theta = -8°$, $0°$, and $+8°$ respectively, the outgoing directions of the optical paths A and B as they return to the beam splitter 30 remain substantially the same for a range of different orientations $\theta$ of the rotating periscope 32. The light from paths A and B is recombined at the beam splitter 30 into an interference signal. This interference signal is sent to the detector 42.

The path length difference between path A and B is equal to $2(TS_A - TS_B)$, where $TS_A$ is the temporal shear for path A and $TS_B$ is the temporal shear for path B. $\alpha$ is the angle between the input light beam and the beam splitter normal as shown in FIG. 3(b) and $\theta$ is the orientation of the rotating periscope given as the angle between the periscope reflector normals and the beam splitter normal, as shown in FIG. 3(c). The equation for the path length difference is given by:

$$TS_A = 2d\cos(\alpha + \theta)$$
$$TS_B = 2d\cos(\alpha - \theta)$$

$$\begin{aligned}\text{Path Length Difference}(PD) &= 2(TS_a - TS_B) \\ &= 4d(\cos(\alpha+\theta) - \cos(\alpha-\theta)) \\ &= -8d\sin\alpha\sin\theta.\end{aligned}$$

The rotating periscope 32 is used to vary the length of the first and second optical paths to form a path length difference that varies with periscope orientation $\theta$.

The detected intensity of the interference signal is given by $$I_d = 2RTI_0\left(1 + \cos\left(\frac{2\pi n}{\lambda_0} PD\right)\right) =$$

$$2RTI_0\left(1 + \cos\frac{-16\pi nd\sin\alpha\sin\theta}{\lambda_0}\right)$$

, wherein R is the beam splitter reflectivity, T is the beam splitter transmission, $I_0$ is the source intensity, $\lambda_0$ is the source wavelength in a vacuum, n is the refractive index of air, PD is the path length difference. The count of the number of cycles of the interference signal, $CC_0$, of the source as the periscope is rotated from orientation $\theta_{min}$ to $\theta_{max}$ is given by $$\text{Cycle Count} = CC_0 = \frac{n\Delta PD}{\lambda_0} = \frac{8nd\sin\alpha\ (\sin\theta_{max} - \sin\theta_{min})}{\lambda_0}$$

If a source light beam of known wavelength is input into the above interferometer, a counter attached to count the cycles of the detected reference interference signal will give an accurate indication of the orientation $\theta$ of the rotating periscope.

An accurate determination of the wavelength of an unknown light beam requires the use of a reference laser. FIG. 4 is a three-dimensional view showing an angular Michelson interferometer of the present invention. Light from a laser 46 with an unknown wavelength is sent into the interferometer at an upward angle $\beta$ with respect to a plane normal to the reflectors 34, 36, 32a and 32b. The beam splitter 30 splits the input light into two beams along first and second optical paths. The first path transmits through the beam splitter 30 along path C; the light reflects off relay reflector 50, reflects off reflector 32a on the rotating platform 32c, reflects off reflector 32b on the rotating platform 32c and reflects off the back reflector 34. The light in the first optical path then follows path A back to the beam splitter 30.

Similarly, the light in the second optical path reflects off the beam splitter 30 and follows path D, reflecting off the relay reflector 52, the parallel reflectors 32b and 32a on the rotating platform 32c and off the back reflector 36. The light in the second optical path then follows path B back to the beam splitter 30.

At point 30a on the beam splitter 30, the light from the first and second optical paths are recombined into an interference signal. The interference signal is transmitted through detector lens 54 which focuses the interference signal onto a small area on the unknown interference signal detector 56. In the preferred embodiment, the interference signal is a few millimeters in diameter before it is focused by the lens 54 and the interference signal forms a diffraction limited spot a few hundred microns in diameter at the detector 56. The detector 56 is located in the focal plane of the detector lens 54. The focal plane of the lens 54 is a distance $f_d = d_d/2\beta$ from the lens 54. The distance $d_d$ is the distance between the unknown interference signal detector 56 and the reference interference signal detector 58, explained below. In this way the lens 54 can focus the interference signal and the reference interference signal described below.

A reference laser 44 is used to more accurately determine the wavelength of the input signal. Both the unknown input beam and the reference laser signal are sent at an angle $\beta$ to the plane normal to reflectors 32a, 32b, 34 and 36. The reference laser signal is input above this plane and the unknown input beam is input below this plane. The reference beam is split at the beam splitter 30 into two beams along or in a first and second reference optical path. The beam in the first reference optical path counter-propagates the beam in the first optical path (i.e. light in the first reference optical path propagates in the direction opposite to the unknown light signal in the first optical path). The light in the first reference optical path follows path A to the back reflector 34 and follows path C back to the beam splitter 30. The second reference optical path counter-propagates the second optical path (i.e. light in the second reference optical path propagates in the direction opposite to the unknown signal in the second optical path). The light in the second reference optical path follows path B to the back reflector 36 and follows path D back to the beam splitter 30. The light from the first and second reference optical paths are recombined at point 30b on the beam splitter 30 into a reference interference signal. The reference interference signal is focused by the detector lens 54 onto the reference interference signal detector 58. In addition, the beam splitter 30 sends the interference signal to the reference laser 44 and the reference interference signal to the laser 46; however, these signals do not to adversely affect the lasers 44 and 46.

The reference laser 44 is arranged with respect to the input beam of unknown wavelength such that the reference optical paths are substantially the same as the unknown signal's optical paths. Since the reference optical paths counter-propagate the unknown signal's optical paths, the path length difference between the reference optical paths is equal to the path length difference between the unknown signal's optical paths. For this reason, the reference interference signal serves as an accurate indication of the rate of change of the interferometer's path length difference. This eliminates the need for high precision motion of the periscope. This arrangement of the reference laser and the unknown laser produces a more accurate indication of the unknown wavelength than if the reference optical paths and the unknown signal's optical paths were different but parallel. Additionally, since the reference optical paths are substantially the same as the unknown signal's optical paths, the contact points of these paths with mirrors 32a and 32b will be substantially the same. For this reason, the interferometer is less sensitive to any lack of flatness in mirrors 32a and 32b.

A slight variation between the reference optical paths and the unknown signal's optical paths may occur since the angle $\beta$ is fixed and the optical path lengths change. This variation, however, does not significantly affect the path length differences.

In addition, if there is good parallelism between the reflectors 32a and 32b on the rotating periscope 32, the angular alignment of the interferometer will be insensitive to periscope orientation. For this reason wobble of the periscope or bearing play, or the misalignment of the axis of rotation does not affect the orientation or alignment of the interferometer.

The photo currents from the detectors will have the form $$I_{ref} = \frac{1}{2} I_{0_r} \left( 1 + \cos\left( \frac{2\pi n}{\lambda_{ref}} PD \right) \right)$$

$$I_? = \frac{1}{2} I_{0_?} \left( 1 + \cos\left( \frac{2\pi n}{\lambda_?} PD \right) \right).$$

$\lambda_{ref}$ is the wavelength of the known reference laser and $\lambda_?$ is the wavelength of the input beam of unknown wavelength. $I_{ref}$ is the intensity of the reference interference signal and $I_?$ is the intensity of the interference signal. $I_{0_r}$ and $I_{0_?}$ are intensity constants.

If the periscope is rotated uniformly at some angular velocity, $\Omega$, then the frequencies of the detector signals are given by $$f_{ref} = \left( \frac{8nd}{\lambda_{ref}} \right) \Omega \sin\alpha \cos\theta$$

$$f_? = \left( \frac{8nd}{\lambda_?} \right) \Omega \sin\alpha \cos\theta$$

ratio of the frequencies of the detector signals.

$$\frac{\lambda_?}{\lambda_{ref}} = \frac{f_{ref}}{f_?} = \frac{CC_{ref}}{CC_?}$$

Even though the frequency of the reference interference signal, $f_{ref}$, and the frequency of the interference signal, $f_?$, will vary based on the orientations $\theta$ of the rotating periscope, both $f_{ref}$ and $f_?$ will vary proportionally. For this reason, the wavelength of the unknown input signal can be determined with counters. The ratio of the wavelength of the unknown signal to the wavelength of the reference signal is proportional to the ratio of the cycle count of the interference signal, $CC_?$, to the cycle count of the reference interference signal, $CC_{ref}$. Additionally, phase locked loop techniques can be used to determine the cycle counts to less than a full cycle.

A pair of synchronization tabs, of which one tab 57 is shown, are placed 180° apart on the rotating periscope 32. A slotted gate detector 59 uses these tabs to detect the orientation of the rotating periscope 32 and provide a gating signal to the circuit 60 when the periscope 32 is in the orientation range in which the interference signal and reference interference signal are valid.

Optionally, circuitry 61 for accurately determining the orientation of the rotating platform is connected to receive the detected reference interference signal from the reference interference detector 58. This circuitry 61 will give an accurate indication of the orientation $\theta$ of the rotating periscope, if the spacing d, angle $\alpha$ and wavelength $\lambda_{ref}$ are accurately known. The circuitry 61 can be a simple cycle counter.

The interferometer would still work if only one optical path is varied in the rotating periscope 32, but the path length difference would be less. If reflector 52 is moved to position 52', the length of the second optical path will not be varied by the rotating periscope 32. Light in the second optical path would follow path D' to the reflector at position 52' and return to the beam splitter 30 along path B'. An interference signal would still be formed at point 30a on the beam splitter 30. This interference signal would be sent to the detector 56.

In one embodiment of the interferometer used to determine the unknown signal's wavelength to an accuracy of about one part per million, realistic dimensions for the wavemeter are as follows:

periscope spacing, d=38 mm
periscope angular range $-\theta_{max} < \omega < \theta_{max}$, $\theta_{max} = 8°$
beam separation angle $\beta$=10 mrad
beam splitter incidence angle $\alpha$=45°
periscope rotation rate $\Omega = 2\pi \times 5$ Hz
wavelength of reference HeNe laser $\lambda_{ref}$=0.63299088 $\mu$(vacuum)
$Pd_{max}$=8d $\sin\alpha\sin\theta_{max}$=30 mm
$\tau_{max}$=100 psec
$f_{ref} = (8 \, dn/\lambda_{ref})\Omega\sin\alpha\cos\theta$=10.67 MHz The path difference range of −30 mm to 30 mm gives about 95,000 reference cycles. For a resolution of 1 part per million, the ratioing frequency counter would have to interpolate to about one eleventh of a cycle by either reciprocal counting techniques or phase locked loop techniques. The 5 Hz rotation rate provides 10 measurements per second.

Circuitry 60 for determining the wavelength of the unknown signal may be simple cycle counters 100, 102 as shown in FIG. 7. Counters 102 and 100 are connected to receive the detected interference signal from the detector 56 shown in FIG. 4 and to receive the detected reference interference signal from the detector 58 shown in FIG. 4, respectively. The counters 102 and 100 are gated by a gate signal from gate detector 59 shown in FIG. 4. Also shown in FIG. 7 is Phase locked loop circuitry 104a and 104b which may optionally be used to get a cycle count accuracy of less than one cycle.

Alternatively, circuitry 60 may be a digital complex down converter as shown in FIG. 6. The detected interference signal on line 61 is sent to a Kestrel chip 62. The Kestrel chip 62 uses a local oscillator 64 to down shift the frequency of the interference signal into two lower frequency quadrature signals. These two signals are sent to the Osprey chips 66 and 68, where the two signals are filtered in filters 67 and 69 and digitally sub-sampled in samplers 71 and 73. Since the two signals have a lower frequency than the detected interference signal, fewer samples are needed for the small complex fast fourier transform. The two digital output signals of the Osprey chips 66 and 68 are then sent to the small complex fast fourier transform circuitry 70. The output of the small complex fast fourier transform is sent to the equalizer 72 to compensate for the passband drop in filters 67 and 69. The spectrum at port 74 then gives some indication of the wavelength of the unknown interference signal.

Notice that the Kestrel chip 62, Osprey chips 66 and 68 and the small complex fast fourier transform circuitry 70 are all clocked at a rate which is twice the frequency of the reference interference signal. Clock generating circuitry 76 is input with the detected reference interference signal on line 63 from the reference interference signal detector 58 shown in FIG. 4 and provides a clock signal on line 77 of FIG. 6. Since the clock signal varies in frequency proportionally to the change in frequency of the detected interference signal, the spectrum at port 74 is not affected by changes in the interference signal's frequency at different orientations θ of the rotating periscope.

Alternately, the Osprey chips 66 and 68 and Kestrel chip 62 could be replaced by a signal Digital Down Converter chip such as the HSP50016 DDC available from the Harris Semiconductor division of the Harris Corporation. This chip is described in D. B. Chester and G. Phillips, "Single Chip Digital Down Converter Simplifies RF DSP Applications", RF Design, Nov 92, pp 39–46.

FIG. 5 is a three-dimensional view of alternate embodiments of the interferometer showing bi-directional reflectors 80 and 82 and two beam splitters 84 and 86. The bi-directional reflectors 80 and 82 and two beam splitters 84 and 86 are shown together for illustrative purposes only. The preferred embodiment of an interferometer with bi-directional reflectors would use only one beam splitter. The use of bi-directional reflectors 80 and 82 extends the path length difference since the light in the first and second paths is reflected through the rotating periscope 32 four times. Light from source 88 at some angle β to some plane normal to the reflectors 32a, 32b, 34 and 36 is sent to a first beam splitter 86 which splits the light into two beams along a first and second optical path. Since the light enters at a downward angle β, the bi-directional reflector 80 can reflect the light in the second optical path back into the rotating periscope for a third and forth pass as described below. Light in the second optical path reflects off of section 80a of the bi-directional reflector 80. Section 80a is reflector with a first orientation such that the light in the second optical path is sent into the rotating periscope. The second optical path returns to the bi-directional reflector 80 and reflects off of section 80b. Section 80b is oriented such that light in the second optical path reflects back into the rotating periscope 32 a third time. The light in the second optical path returns to the bi-directional reflector 80 at section 80c oriented with the first orientation such that the light is reflected to the second beam splitter 84.

For reasons of clarity, the first optical path is not shown in FIG. 5. Light in the first optical path also makes four passes through the rotating periscope 32. The light in the first and second optical path are recombined into an interference signal in the second beam splitter 84. The use of two beam spitters 86 and 84 makes this interferometer a Mach-Zehnder interferometer. The interference signal is detected at detector 90. In a similar manner as that describe above, a reference laser 81 is used to produce a interference signal detected at second detector 91.

Since the first and second paths go through the rotating periscope four times, the path length difference is equal to $-16\, d\sin\alpha\sin\theta$. The increased path length difference doubles the number of detected interference signal cycles for a given periscope angular range and thereby increases the frequency resolving power of the interferometer. A disadvantage of the use of bi-directional reflectors 80 and 82 is that light in each optical path makes thirteen bounces off of reflectors in this interferometer as opposed to seven bounces off reflectors in the interferometer shown in FIG. 4. This means the reflectors shown in FIG. 5 must be flatter to keep the wave front aberrations due to the reflector surfaces within $+/- \lambda/4$ so that a valid interference signal is obtained.

Various details of the implementation and method are merely illustrative of the invention. It will be understood that the various changes of details may be within the scope of the invention, which is to be limited only by the appended claims.

What is claimed is:

1. An interferometer for measuring the wavelength of an input light beam of unknown wavelength, the interferometer comprising:

a reference laser adapted to produce a reference light beam of known wavelength;

a beam splitter adapted for splitting the input light beam into two beams along first and second optical paths and adapted for splitting the reference light beam into two beams along first and second optical reference paths, the first optical path and the first reference optical path being substantially the same and the second optical path and the second reference optical path being substantially the same, wherein light in the first optical path counter-propagates light in the first reference optical path and light in the second optical path counter-propagates light in the second reference optical path;

a rotating periscope for varying the lengths of the first optical path and the first optical reference path, the periscope comprising first and second reflectors on a rotating platform, the first and second reflectors being substantially parallel, the first optical path and the first optical reference path extending from the beam splitter directly to the first and second reflectors without passing through any intervening bodies;

back reflector means for reflecting light in the first optical path and light in the first optical reference path back through the periscope;

means for recombining light from the first and second optical paths into an interference signal and for recombining light from the first and second optical reference paths into a reference interference signal;

a first detector for detecting the interference signal, and a second detector for detecting the reference interference signal.

2. An interferometer as in claim 1 wherein the rotating periscope is adapted to vary the length of the second optical path and the length of the second optical reference path and wherein the back reflector means is adapted to reflect light in the second optical path and the second optical reference path back through the rotating periscope.

3. An interferometer as in claim 1 wherein the interferometer further comprises means connected to the first and second detectors for determining the wavelength of the input light beam of unknown wavelength.

4. An interferometer as in claim 3 wherein the wavelength determining means further includes means for performing a fast Fourier transform.

5. An interferometer as in claim 4 wherein the wavelength determining means includes means for down shifting the frequency of the detected interference signal from the detector to a lower frequency signal, the lower frequency signal being supplied to the means for performing a fast Fourier transform.

6. An interferometer as in claim 3 wherein the wavelength determining means includes counters adapted to receive the detected interference signal from the first detector and the detected reference interference signal from the second detector.

7. An interferometer as in claim 3 and further comprising a gate detector for supplying a gating signal to the determining means at predetermined orientations of the rotating platform.

8. An interferometer as in claim 1 wherein the recombining means comprises a second beam splitter.

9. An interferometer as in claim 1 wherein the recombining means comprises the beam splitter.

10. An interferometer as in claim 9 wherein the back reflector means comprises two back reflectors arranged in a manner that for a range of orientations of the rotating periscope, light in the first and second optical paths reflects off the reflectors on the rotating periscope, reflects back off one of the back reflectors and then reflects another time off the reflectors on the rotating periscope towards the beam splitter, wherein the directions of the light in the first and second optical paths reflecting another time off the reflectors on the rotating periscope towards the beam splitter define outgoing directions, these outgoing directions remain substantially the same for the range of orientations of the rotating periscope.

11. An interferometer as in claim 9 and further comprising a detector lens adapted for focusing the interference signal onto the first detector and adapted for focusing the reference interference signal onto the second detector.

12. An interferometer as in claim 1 wherein the parallel reflectors on the rotating periscope are separated by air.

13. An interferometer for measuring the wavelength of an input light beam of unknown wavelength, the interferometer comprising:

a reference laser adapted to produce a reference light beam of known wavelength;

a beam splitter adapted for splitting the input light beam into two beams along first and second optical paths and adapted for splitting the reference light beam into two beams along first and second optical reference paths;

a rotating periscope for varying the lengths of the first optical path and the first optical reference path, the periscope comprising first and second reflectors on a rotating platform, the first and second reflectors being substantially parallel;

back reflector means for reflecting light in the first optical path and light in the first optical reference path back through the periscope;

additional reflector means for sending light in the first and second paths back through the rotating periscope a third time;

means for recombining light from the first and second optical paths into an interference signal and for recombining light from the first and second optical reference paths into a reference interference signal;

a first detector for detecting the interference signal, and a second detector for detecting the reference interference signal.

14. An interferometer as in claim 13 wherein the additional reflector means comprises bi-directional reflectors having reflectors of a first orientation and reflectors of a second orientation.

15. A method for measuring the wavelength of a light beam from a light source using a second light beam of known wavelength comprising the steps of:

(a) splitting the light beam into two beams along a first and second optical path and splitting the second light beam of a known wavelength into two beams along a first reference optical path and a second reference optical path;

(b) reflecting the light in the two optical paths and the light in the two reference optical paths directly off a pair of parallel reflectors without passing the light through any intervening bodies;

(c) arranging the first and second light beams such that the first optical path and the first reference optical path are substantially the same and such that the second optical path and the second reference optical path are substantially the same, the arranging step being such that light into the first optical path counter-propagates light in the first reference optical path and light in the second optical path counter-propagates light in the second reference optical path;

(d) varying the lengths of the first and second paths and the lengths of the first and second reference optical paths by rotating the reflectors;

(e) recombining light from the first and second optical paths into an interference signal;

(f) recombining light from the first and second reference optical paths into a reference interference signal;

(g) detecting the interference signal and the reference interference signal; and (h) determining the wavelength of the light beam from the interference signal and the reference interference signal.

16. A method as in claim 15 and further comprising the step of arranging the light beam and the second light beam of known wavelength such that one of the beams before it is split is incident at an angle downward to a plane normal to the pair of parallel reflectors and such that the other beam before it is split is incident at an opposite angle upward to a plane normal to the pair of parallel reflectors.

* * * * *